United States Patent
Prochazka

(10) Patent No.: US 11,904,683 B2
(45) Date of Patent: Feb. 20, 2024

(54) METHOD FOR SETTING A CRUISING MODE OF A VEHICLE

(71) Applicant: AUDI AG, Ingolstadt (DE)

(72) Inventor: Walter Prochazka, Hepberg (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 18/047,002

(22) Filed: Oct. 17, 2022

(65) Prior Publication Data

US 2023/0122114 A1 Apr. 20, 2023

(30) Foreign Application Priority Data

Oct. 19, 2021 (DE) .......................... 102021127049.9

(51) Int. Cl.
*B60K 20/06* (2006.01)
*F16H 59/02* (2006.01)

(52) U.S. Cl.
CPC ......... *B60K 20/06* (2013.01); *F16H 59/0204* (2013.01); *F16H 2059/0243* (2013.01); *F16H 2059/0247* (2013.01)

(58) Field of Classification Search
CPC ......... F16H 59/0204; F16H 2059/0243; F16H 2059/0247; B60K 20/06
See application file for complete search history.

(56) References Cited

U.S. PATENT DOCUMENTS

| | | | | |
|---|---|---|---|---|
| 5,808,374 | A * | 9/1998 | Miller | B60K 37/06 200/61.57 |
| 2004/0117084 | A1* | 6/2004 | Mercier | B60R 11/02 307/10.1 |
| 2008/0243351 | A1* | 10/2008 | Isogai | B60W 30/16 701/96 |
| 2009/0223789 | A1* | 9/2009 | Ballard | B62D 1/046 200/61.54 |
| 2020/0255022 | A1* | 8/2020 | Tsuji | B60W 50/10 |

FOREIGN PATENT DOCUMENTS

| | | |
|---|---|---|
| DE | 10231518 A1 | 2/2004 |
| DE | 102009031629 A1 | 1/2011 |
| DE | 102011075199 A1 | 11/2012 |
| DE | 102011054337 A1 | 4/2013 |
| DE | 102013207015 A1 | 10/2014 |
| DE | 102015113623 A1 | 2/2016 |
| DE | 102017209698 B3 | 10/2018 |
| DE | 102018205039 A1 | 10/2019 |
| EP | 1160119 A1 | 12/2001 |
| EP | 3045693 A1 | 7/2016 |

* cited by examiner

*Primary Examiner* — Edwin A Young
(74) *Attorney, Agent, or Firm* — Seed IP Law Group LLP

(57) ABSTRACT

Some embodiments relate to a method for setting a cruising mode of a vehicle, wherein a human/machine interface is arranged on a steering wheel of the vehicle for shifting a transmission of the vehicle, this human/machine interface comprising at least one first and at least one second switch segment and at least one switch, wherein the switch segments are arranged on the at least one switch, and in the event that the at least one first and the at least one second switch segment of the at least one switch are activated at the same time the cruising mode is set for the vehicle.

10 Claims, 2 Drawing Sheets

METHOD FOR SETTING A CRUISING MODE OF A VEHICLE

BACKGROUND

Technical Field

Embodiments of the invention relate to a method for setting a cruising mode of a vehicle and a system for setting a cruising mode of a vehicle.

Description of the Related Art

In order to set a function of a vehicle, the vehicle may have a switch, for example, the operating of which can set the function.

A method for controlling a vehicle is known from the document EP 1 160 119 A1.

Document DE 10 2011 075 199 A1 describes a manually activated coupling arrangement.

A commercial vehicle is known from document EP 3 045 693 A1.

Given this background, one problem to be solved was to set an intended operating state for a vehicle in simple manner.

BRIEF SUMMARY

Some embodiments include a method for setting a cruising mode as the driving state of a vehicle or for a vehicle, such as an automobile. A human/machine interface is arranged on a steering wheel of the vehicle for shifting a transmission of the vehicle, this human/machine interface comprising at least one first and at least one second switch segment and at least one switch, wherein the switch segments are arranged on the at least one switch or associated with the at least one switch and distributed along it, the switch segments being generally manually operated or activated, or designed to be so operated or activated. In the event that the at least one first and the at least one second switch segment of the at least one switch are operated and/or activated at the same time or simultaneously, the cruising mode is automatically set for the vehicle.

The method is carried out by a driver of the vehicle as the user who steers the vehicle with at least one hand of their two hands, i.e., only with one hand, usually with both hands, by means of the steering wheel. Furthermore, it is possible for the human/machine interface to be operated on the steering wheel with the at least one hand, i.e., only with one hand or with both hands. The at least one switch is manually operated or activated by at least one finger of at least one hand of the driver as the user.

It is provided in one embodiment that both or two of the switch segments to be operated and/or activated for the setting of the cruising mode of the at least one switch, in general all of the switches, are designed to be counterrotating and regardless of the method to carry out different, for example opposite and/or alternative functions of the vehicle each time whenever only one of the two switch segments is operated. If both switch segments are operated at the same time, however, the cruising mode is carried out as an additional function.

In one embodiment, two different switch settings are provided for the at least one switch, a first switch setting being associated with the first switch segment and a second switch setting with the second switch segment, and by operating and/or activating the first switch segment the first switch setting of the at least one switch is set, and by activating the second switch segment the second switch setting of the at least one switch is set, the two switch settings being different from each other.

It is also possible, independently of the proposed method, to enter different, such as oppositely directed commands in the at least one switch and/or through the at least one switch and to carry out two different functions, such as opposite and/or alternative functions, by means of the two different and oppositely configured switch settings, if only one switch setting has been set by activating only at least one switch segment. Thus, for example, it is possible to upshift a gear of the transmission by setting the first switch setting and to downshift a gear of the transmission by setting the second switch setting.

By simultaneous activating of both switch segments it is possible with the method to set both switch settings, wherein a so-called hybrid switch setting of the at least one switch is set, depending on the definition, and in this case or in this way the cruising mode will be carried out or set. The at least one switch is designed as a shift paddle having two switch segments for two switch settings or as a button having only one switch segment for only one switch setting.

It is possible to implement the method for a vehicle in which only a single switch, usually only a single shift paddle, is arranged on the steering wheel as the human/machine interface, which comprises or comprise the two switch segments, the activating of which sets or can set the two different switch settings. The cruising mode is then automatically set in one embodiment of the method when both switch segments of the only one switch, usually the only one shift paddle, are operated and/or activated at the same time. The only one switch is usually operated by only one hand of the driver. It is possible for the driver to operate with a first finger the first switch segment and with a second finger the second switch segment.

It is likewise possible to carry out the method for a vehicle in which two switches are arranged on the steering wheel as the human/machine interface, these two switches being configured as shift paddles each of them having two activatable switch segments or as buttons, where each button has only one activatable switch segment. Two switches usually can only be operated or are to be operated with two hands, which is the case when the two switches are spaced apart by a first large distance, and a simultaneous operating or activating of the two switches is only possible with two hands, generally with the fingers of two hands. If the two switches have a second small distance from each other, which is less than the first large distance, then both switches are to be operated or activated by the fingers of one hand at the same time.

In one embodiment, the two switches have the first large distance which is larger than the spacing between the fingertip of the thumb and the fingertip of the little finger of the spread-apart hand of the average adult person. Regardless of the specific value of the respective distance between the two switches or the two fingertips of the person, it is generally necessary for the first switch to be operated by a finger of a first hand and the second switch to be operated by a finger of a second hand, while both switches can only be operated by two hands at a given time. In the method, both switches are to be operated or activated by fingers of both hands for the setting of the cruising mode as the driving state, and the steering wheel is to be steered in any case with two hands, which grasp the steering wheel for this purpose. However, if the two switches have the second small spacing, it is also possible to operate both switches at the same time with fingers of only one hand, regardless of whether the driver is guiding the steering wheel with only one hand or with two hands.

Both switches may be configured as shift paddles to comprise respectively the two switch segments, the activation of which sets one of the two different switch settings for respectively one shift paddle. In an embodiment of the method, the cruising mode is automatically set when, for one of the two shift paddles, the first of the two switch segments is operated or activated and for the other of the two shift paddles the other or second of the two switch segments is operated or activated, usually at the same time. Independently of the method, usually only the first switch segment or only the second switch segment of at least one of the two shift paddles and thus only one shift paddle and one switch segment is operated at a time, whereupon only one of the two different switch settings is set.

The cruising mode is automatically set when, for one of the two shift paddles, the first switch segment and at the same time for the other corresponding one of the two shift paddles the second switch segment is operated and/or activated, i.e., when for example the first switch segment at the first shift paddle and the first switch segment at the second shift paddle is operated and/or activated, or when the second switch segment at the first shift paddle and the second switch segment at the second shift paddle is operated and/or activated, the two different, for example oppositely directed switch settings being set at the same time, considering the two shift paddles taken together. Alternatively or in addition, it is possible for the cruising mode to be set when both switch segments of only one of the two shift paddles are operated at the same time, the current switch setting set for the other of the two shift paddles remaining the same or unchanged, if it is not operated.

Alternatively, each of the two switches may be designed as buttons to have one respective switch segment, where a first button comprises the first switch segment and a second button comprises the second switch segment. By activating one button each time and thus one switch segment each time, one of the two different switch settings will be set. In one embodiment of the method, the cruising mode is automatically set when both buttons and thus both switch segments are operated or activated, usually at the same time. Regardless of the method, usually only the first button and thus the first switch segment or only the second button and thus the second switch segment is operated or activated, and each time only one of the two different switch settings will be set.

In one embodiment, the cruising mode is set when both switch segments, i.e., both switch segments of the at least one switch, is operated and/or activated, usually at the same time or synchronously or simultaneously, at least within and/or during a time interval comprising, for example, a low single-digit number of a few hundred milliseconds, such as at minimum 100 milliseconds or 0.1 seconds, generally from 500 milliseconds or 0.5 seconds to 1.5 seconds, at maximum 2 seconds, where both switch settings are set for only one or for two switches. It is possible to set and/or define the duration of the time interval, it being furthermore possible to set this duration individually for a particular driver and/or to vary it depending on the user. If the vehicle is driven alternately by multiple drivers, it is possible to set a time interval provided individually for this driver, for example automatically, and for this the particular driver will be recognized by sensor prior to the particular drive.

In one embodiment, the cruising mode is set if both switch segments, i.e., both switch segments of the only one shift paddle or the first switch segment of the first shift paddle and the second switch segment of the second shift paddle or the second switch segment of the first shift paddle and the first switch segment of the second shift paddle or both buttons are operated and/or activated at the same time or synchronously or simultaneously at least within and/or during the time interval.

In one embodiment, the cruising mode is set by simultaneous, usually manual pressing of the first and the second switch segment for activating or operating the at least one switch.

The method in one embodiment is implemented for a so-called electric vehicle (BEV, battery electric vehicle), which is driven or propelled by at least one electric machine. It is also possible for the method to be implemented for a vehicle which is alternatively driven or propelled by a combustion engine, the vehicle being designed or designated as a so-called hybrid vehicle.

In some embodiments, a system is designed to set a cruising mode as the driving state of a vehicle, such as a motor vehicle, wherein the system comprises a human/machine interface for shifting a transmission of the vehicle, this human/machine interface being arranged on a steering wheel of the vehicle and comprising at least one first and at least one second switch segment and at least one switch, wherein the switch segments are arranged on the at least one switch. In the event that the at least one first and the at least one second switch segment of the at least one switch are activated or operated at the same time, the human/machine interface or the at least one switch is designed to control the transmission and bring about a setting of the cruising mode for the vehicle.

The human/machine interface in one embodiment comprises only one switch or two switches. In this case, only one switch has two different switch segments, while two switches have at least two different switch segments. In the case of two switches, a first switch has a first switch segment and a second switch has a second switch segment, the two or both switches taken together comprising two different switch segments, i.e., the first and the second switch segment. If a first switch segment and a second switch segment of the at least one switch, i.e., two switch segments of the only one switch or in the case of two switches the first switch segment of one respective switch and the second switch segment of the other switch are operated and/or activated at the same time, the human/machine interface is adapted to control the transmission and cause the cruising mode to be set automatically for the vehicle.

In one embodiment, the at least one switch is configured as a shift paddle, comprising the first and the second switch segment. It is possible for the human/machine interface and thus the system to comprise, in a first variant, only one shift paddle having two switch segments or, in a second variant, alternatively two shift paddles each having two switch segments.

Furthermore, as a further variant it is possible for the human/machine interface and the system to comprise two switches configured as buttons, wherein a first button comprises the first switch segment and a second button comprises the second switch segment.

The system in one embodiment comprises a controller, which is switched or arranged between the at least one switch as a human/machine interface on the steering wheel and the transmission. Two different switch settings are provided for the at least one switch, for example oppositely directed switch settings, wherein a first switch setting is associated with the first switch segment and a second switch setting with the second switch segment. The controller is designed to detect at least one switch setting, which results from the operating and/or activating of a particular switch segment, and to control the transmission on this basis, the controller being designed to generate a selection signal for the transmission depending on which switch segment is pressed and which switch setting is set.

If the two switch segments of the only one shift paddle, the two shift paddles, or the two buttons are activated at the same time, for example by being pressed, and both switch settings of the only one shift paddle, the two shift paddles, or the two buttons are set at the same time, the controller is designed to generate a selection signal for executing the cruising mode and to relay this to the transmission and execute the cruising mode for the vehicle by means of or with the transmission and/or bring about an execution of the cruising mode.

It is possible for one embodiment of the proposed method to be carried out with one embodiment of the proposed system. The at least one switch, usually the at least one shift paddle, can also be called a paddle. With the method and the system, the cruising mode can be set by means of the behavior of the at least one switch or at least one paddle, for example for the electric vehicle (BEV).

In one embodiment, the two switch segments and thus the two switch settings of the at least one switch are functionally arranged such that, in an alternative operation of the transmission, a gear is upshifted when the first switch segment is operated and the first switch setting is set, for example. On the other hand, in the alternative operation of the transmission a gear is downshifted when the second switch segment is operated and the second switch setting is set, for example. In the method, the cruising mode is enabled when both switch segments are operated at the same time and both switch settings are set at the same time, which is possible when utilizing only one switch or two switches. Regardless of the number of switches, both of the different switch segments, for example opposite switch segments, are to be pressed and thus both switch settings are to be set in order to carry out the cruising mode. The pressing of both switch segments at the same time in the defined time window results in the cruising mode or a cruising behavior in the vehicle. In the cruising mode or when cruising, the current speed level or the current gear of the vehicle is maintained, while the wheel torque of the drive wheels of the vehicle is set at 0 Nm. Usually the current gear or the current speed level is set when the transmission is upshifted by one gear or downshifted by one gear by operating only one switch segment of a switch and by setting only one switch setting of the one switch among one switch or among two switches.

If the steering wheel comprises two switches, such as two shift paddles or two buttons, the cruising or the cruising mode is activated as the driving state of the vehicle by activating both switches or both paddles or both buttons if the two different switch settings are set simultaneously.

A setting of the cruising mode by using the at least one switch is also possible, for example, when a driving state has already or at first been determined for the vehicle, such as a propulsion operation, when the vehicle is rolling, a traction operation, or a particular selected gear and the resulting gear-dependent driving state, the cruising or the cruising mode being set by operating the at least one switch if this particular aforementioned driving state has already been set in advance and the cruising mode will be set based on the driving state already set.

Of course, the above mentioned features and those yet to be explained in the following can be used not only in the particular indicated combination, but also in other combinations or standing alone, without leaving the scope of the present disclosure.

BRIEF DESCRIPTION OF THE SEVERAL VIEWS OF THE DRAWINGS

Embodiments of the invention are represented schematically with the aid of the drawings and shall be described schematically and at length with reference to the drawings.

The figures shall be described continuously and comprehensively. The same reference numbers indicate the same components.

DETAILED DESCRIPTION

Figure 1:
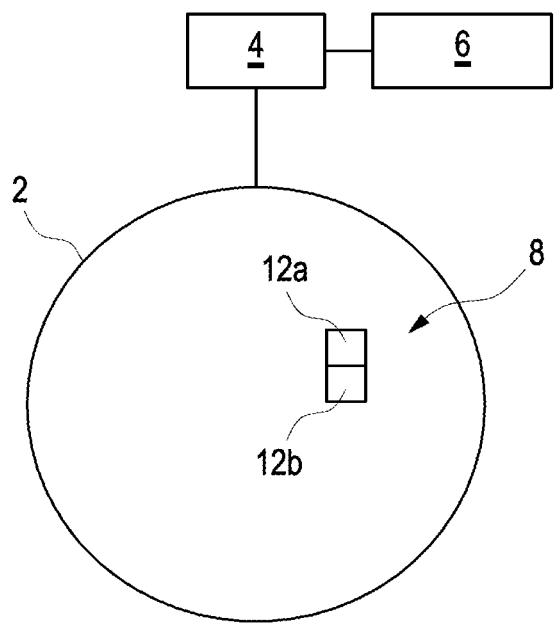
FIG. 1 shows in schematic representation a first embodiment of a system to carry out a first embodiment of a method.
Figure 2:
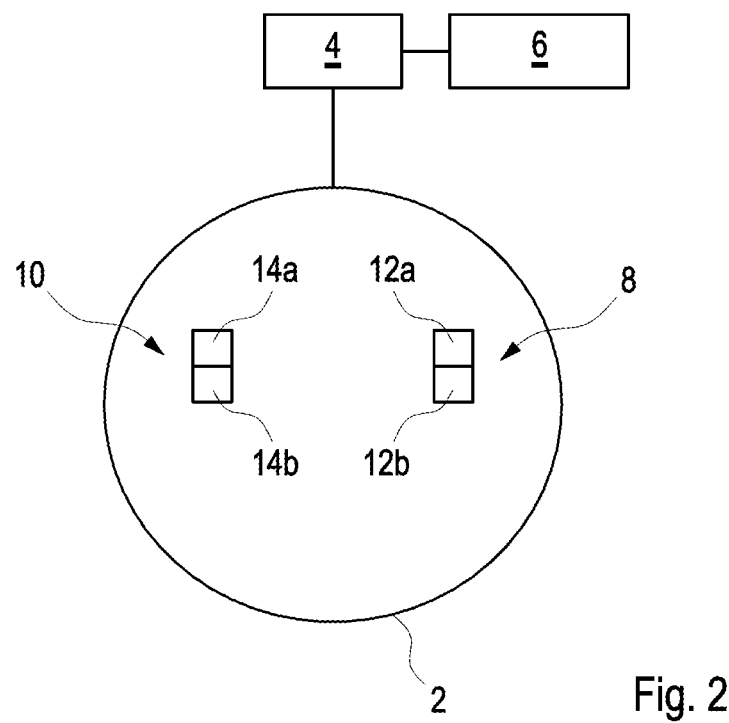
FIG. 2 shows in schematic representation a second embodiment of a system to carry out a second embodiment of a method.
Figure 3:
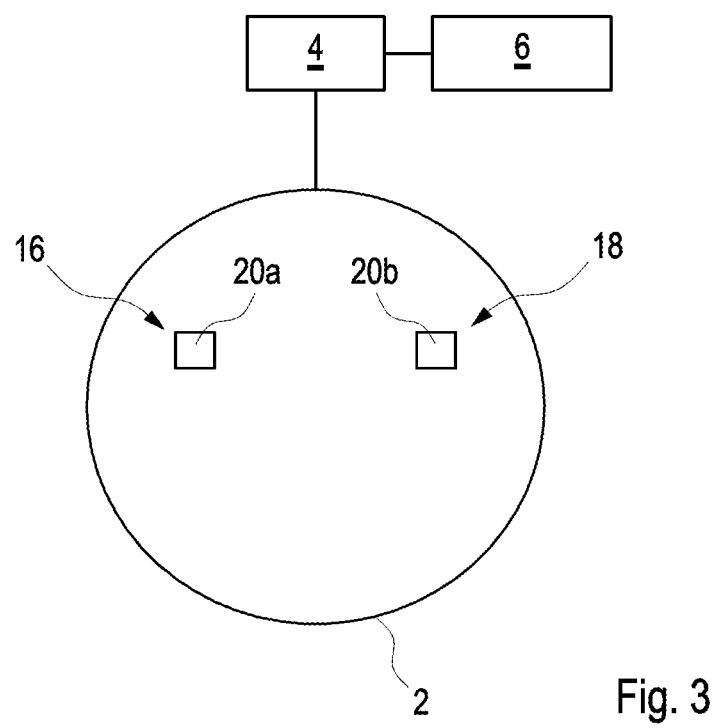
FIG. 3 shows in schematic representation a third embodiment of a system to carry out a third embodiment of a method.

All of FIGS. 1, 2 and 3 show a steering wheel 2 in the interior of a vehicle, configured here as a motor vehicle, a controller 4, and a transmission 6 of this vehicle, the controller 4 being adapted to control and thus also adjust the transmission 6.

Each embodiment of the system that is shown in FIGS. 1 and 2 comprises, besides the controller 4, a human/machine interface integrated in the steering wheel, comprising at least one shift paddle 8, 10 as the switch, wherein the at least one shift paddle 8, 10 comprises at least one first manually operated switch segment 12a, 14a for setting a first switch setting and at least one second manually operated switch segment 12b, 14b for setting a second switch setting.

In the case of the first embodiment of the system (FIG. 1), the steering wheel 2 comprises, as a switch, only one shift paddle 8 having two switch segments 12a, 12b for two different switch settings of the human/machine interface.

In the case of the second embodiment of the system (FIG. 2), the steering wheel 2 comprises, as two switches, two shift paddles 8, 10 having two switch segments 12a, 12b, 14a, 14b each, for two respective different switch settings of the human/machine interface.

In the case of the third embodiment of the system (FIG. 3), the steering wheel 2 comprises, as two switches, two buttons 16, 18 each having one switch segment 20a, 20b as the human/machine interface. Here, a first button 16 is provided with its first switch segment 20a for a first switch setting and a second button 18 is provided with its second switch segment 20b for a second switch setting, these two switch settings being different from each other.

What all of the embodiments of the method have in common, being implemented or able to be implemented with the three embodiments of the system described herein, is that by simultaneous operating or activating, such as manual pressing, of both switch segments 12a, 12b, 14a, 14b, 20a, 20b of the at least one switch, as the human/machine interface, the two different, such as opposite switch settings being set at the same time, these two different and/or opposite switch settings are detected and/or registered by the controller 4, and the transmission 6 is controlled by the controller 4 on this basis, the cruising mode being set for the transmission 6 and the vehicle being placed in cruising mode.

In the case of the first embodiment of the method with the first system (FIG. 1), for the setting of the cruising mode both switch segments 12a, 12b of the only one shift paddle 8, as the switch, are pressed at the same time and both of the different switch settings are set.

In the case of the second embodiment of the method with the second system (FIG. 2), for the setting of the cruising mode both switch segments 12a, 12b, 14a, 14b of both shift paddles 8, 10, as the switch, are pressed and both of the different switch settings are set.

In this case, for the setting of the cruising mode it is possible to press the first switch segment 12a on the first shift paddle 8 and at the same time to press the second switch segment 14b on the second shift paddle 10. For this, it is likewise possible to press the second switch segment 12b on the first shift paddle 8 and at the same time to press the first switch segment 14a on the second shift paddle 10, whereupon both of the different switch settings will be set at the same time. It is likewise possible for the setting of the cruising mode to press both switch segments 12a, 12b, 14a, 14b of only one shift paddle 8, 10, as only the two switch segments 12a, 12b of the first shift paddle 8 or only the two switch segments 14a, 14b of the second shift paddle 10.

In the case of the third embodiment of the method with the third system (FIG. 3), for the setting of the cruising mode both buttons 16, 18 and thus both switch segments 20a, 20b are pressed and both of the different switch settings are set.

German patent application no. 10 2021 127049.9, filed Oct. 19, 2021, to which this application claims priority, is hereby incorporated herein by reference, in its entirety. Aspects of the various embodiments described above can be combined to provide further embodiments. In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. A method for setting a cruising mode of a vehicle, wherein a human/machine interface is arranged on a steering wheel of the vehicle for shifting a transmission of the vehicle, the human/machine interface comprising at least one first switch segment and at least one second switch segment and at least one switch, wherein the switch segments are arranged on the at least one switch, the method comprising:
   setting the cruising mode of the vehicle when the at least one first switch segment and the at least one second switch segment of the at least one switch are both activated within a threshold period of time.

2. The method according to claim 1, in which only a single switch is arranged on the steering wheel comprising exactly two switch segments, namely, the first and second switch segments, and wherein the cruising mode is set when both of the exactly two switch segments, namely, the first and second switch segments, of the switch are activated at the same time.

3. The method according to claim 1, wherein the at least one switch is a first switch and the human/machine interface further comprises at least one third switch segment and at least one fourth switch segment and a second switch, wherein the third and fourth switch segments are arranged on the second switch, and the method comprises setting the cruising mode of the vehicle when all four of the first, second, third, and fourth switch segments are activated at the same time.

4. The method according to claim 1, further comprising setting the cruising mode when both switch segments are activated at the same time.

5. The method according to claim 1, wherein the vehicle is driven with at least one electric machine.

6. A system for setting a cruising mode of a vehicle, comprising:
   a human/machine interface for shifting a transmission of the vehicle, being arranged on a steering wheel of the vehicle,
   wherein the human/machine interface comprises at least one first and at least one second switch segment and at least one switch,
   wherein the first and second switch segments are arranged on the at least one switch, and
   wherein the system is configured such that, when the at least one first switch segment and the at least one second switch segment of the at least one switch are activated at the same time, the at least one switch controls the transmission to bring about a setting of the cruising mode for the vehicle.

7. The system according to claim 6, wherein the at least one switch is configured as a shift paddle comprising the first switch segment and the second switch segment.

8. The system according to claim 7, comprising only one shift paddle having two switch segments or two shift paddles each having two switch segments.

9. The system according to claim 6, having two switches designed as buttons, wherein a first button comprises the first switch segment and a second button comprises the second switch segment.

10. The system according to claim 6, having a controller which is switched between the at least one switch and the transmission, and two different switch settings are provided for the at least one switch, the controller being designed to detect at least one switch setting resulting from the operating of the at least one switch segment and to control the transmission on this basis, and in the event that both switch settings are set at the same time the controller is designed to carry out the cruising mode for the vehicle with the transmission.

* * * * *